Jan. 23, 1962  J. LAMONT  3,018,377
PHOTOELECTRIC DEVICE
Filed July 20, 1959

INVENTOR
J. LAMONT
S. Gundersen
ATTORNEY

United States Patent Office 3,018,377
Patented Jan. 23, 1962

3,018,377
PHOTOELECTRIC DEVICE
John Lamont, North Arlington, N.J., assignor to Western Electric Company, Incorporated, New York, N.Y., a corporation of New York
Filed July 20, 1959, Ser. No. 828,373
4 Claims. (Cl. 250—222)

This invention relates to photoelectric devices, and more particularly, to a device for detecting unsoldered or unwelded spots in the lap seam of an advancing metal cable sheath.

In cable for telephone communication a large number of insulated wires are enclosed in a metal sheath which protects the wires against lightning and moisture. The sheath is fabricated from a flat strip of metal which is formed around the wires with its edges overlapped. The overlapping edges are soldered, in the case of steel, or welded, in the case of aluminum, closing the metal sheath. Heretofore, inspection of the seams for unsoldered or unwelded spots, called "faults," has been by visual or electro-mechanical means.

In attempting to utilize a photoelectric device to scan the cable seam for faults, difficulty has been experienced due to the rapid continuous speed of cable production and the consequent lateral non-alignment between the seam of the cable sheath and the photoelectric device. If a large photoelectric device is employed, allowing for lateral excursions of the cable seam, changes in photoelectric current by faults coming within the field of the photoelectric device are small compared to the photoelectric current given by illumination of the entire field. Slight malfunctioning of the device produces noise as great as, in current strength, the small signal produced by faults showing on the field of the photoelectric device.

An object of the invention is a photoelectric detector, sensitive to small objects in a relatively large area in which the detected object gives a signal greater than noise produced by the device.

A further object of the invention is a photoelectric scanner which detects faults in the lap seam of continuously moving cable.

In accordance with the present invention the screen of the photoelectric device comprises a mosaic of photoresponsive elements connected in series. The screen is sufficiently large to accommodate considerable lateral movement of the object being scanned by the photoelectric device. Each element of the screen is relatively small compared to any dark portion of the scanned object, so that the presence of a dark portion causes a discernable signal in the output of the series circuit.

Figure 1:
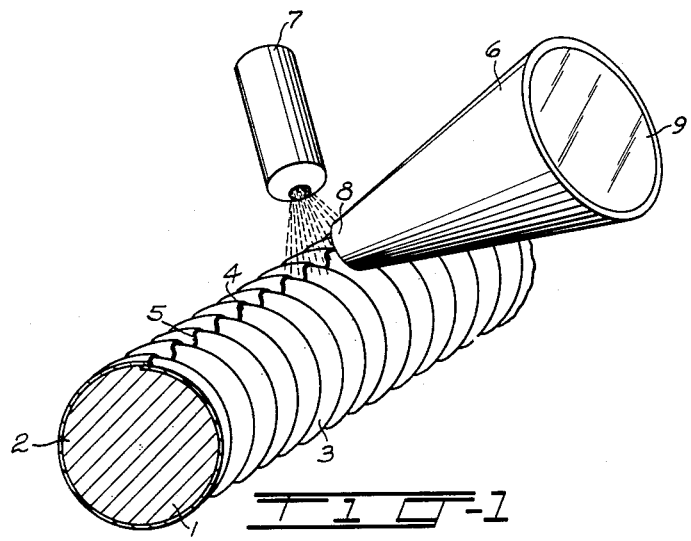
FIG. 1 is a perspective view illustrating the positioning of the photoelectric device in relation to a cable being manufactured.
Figure 2:
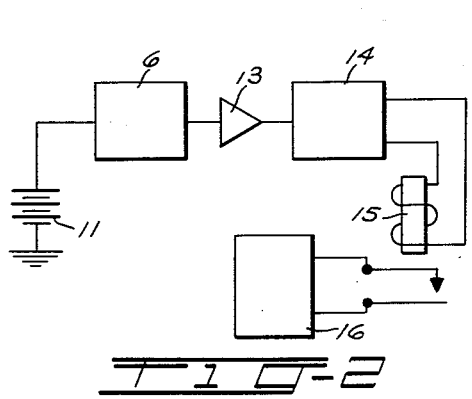
FIG. 2 is a block circuit diagram of a preferred embodiment of the invention.

Referring now to FIG. 1, cable 1 consists of a core 2 of a plurality of individually insulated wires. Around core 2 metal sheath 3 is bent. In the type of cable known as "stalpeth," sheath 3 is of steel and covers a sheath of aluminum, the aluminum being for lightning protection. The steel sheath 3 is .007 in. thick, of tin plated or terneplate corrugated steel. Edges 5 of steel sheath 3 overlap a quarter to three-eighths of an inch, and are soldered at lap seam 4 by a flat 30% tin-70% lead, rosin core solder strip. The solder strip is inserted into lap seam 4 and then cable 1 passes under a radio frequency induction coil, where the lap seam of the cable is simultaneously heated and compressed. "Stalpeth" cable, subsequent to soldering of lap seam 4, is covered with hot asphalt-rubber flooding and an extruded polyethylene plastic jacket.

Subsequent to the sealing of lap seam 4, cable 1 is inspected by photoelectric detector 6. Light from source 7 shines on seam 4 and the area about the seam in which the seam is likely to drift. The light is reflected into optical enlarging lens 8 of photoelectric detector 6 if the seam is without faults. A fault is non-reflecting and shows on screen 9 of photoelectric detector 6 as dark portion 10. Lens 8 is of convex optical glass producing an image of four-power magnification on the screen 9. The degree of magnification and the element size are selected to make it possible to detect a fault of the smallest size required.

Screen 9 of photoelectric detector 6 may consist of photoresponsive elements such as photoemissive cells, photovoltaic cells, barrier photocells, or photoconductive cells. In the preferred embodiment, elements 12 of screen 9 consist of photoconductive cell elements whose resistance decreases when illuminated and increases when not illuminated. Current from electrical source 11 flows into photoelectric detector 6 in those photoelectric devices requiring an outside source of power.

The electrical output from photoelectric detector 6 is conducted to amplifier 13, to gas tube (thyratron) control 14, and relay 15. Relay 15 operates alarm 16. By adjustment of either amplifier 13 or gas tube control 14, only those faults considered sufficiently serious to operate alarm 16 do so.

Figure 3:
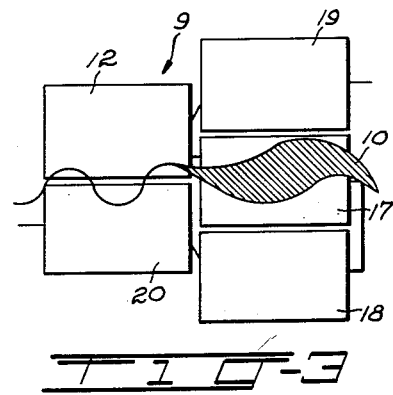
FIG. 3 is a top plan view of the screen of the photoelectric device.

Screen 9, as shown in FIG. 3, consists of a mosaic of photoresponsive elements 12 which are electrically insulated from each other and connected in series. The series connections insure that a fault showing on any one element of the mosaic will provide a strong change in electrical output from the serially connected arrangement. In FIG. 3 fault 10 occupies almost the entire area of element 17 and produces a change to almost zero in electrical output from chain of elements 17, 18, 19, 20 and 12. If, however, elements 17, 18, 19, 20 and 12 were not separate, but were one large element, the change in electrical output would be much smaller. The lateral stacking of elements, such as elements 17, 18 and 19, gives a broader screen 9 to provide for lateral movement of lap seam 4.

Figure 4:
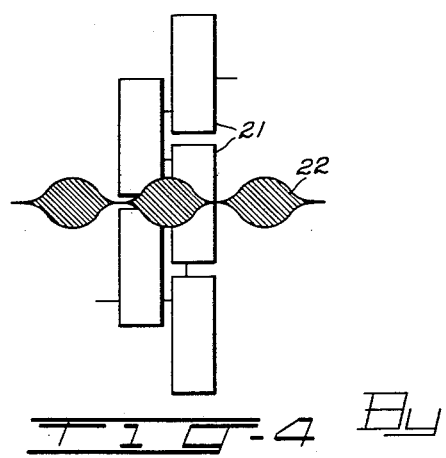
FIG. 4 is a top plan view of an alternative screen.
Figure 5:
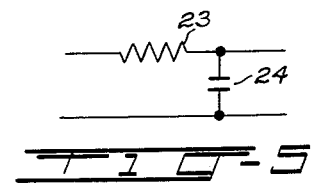
FIG. 5 is a circuit employed with the screen of FIG. 4.

An alternative embodiment of the invention is shown in FIGS. 4 and 5 in which the elements of screen 21 are elongated parallelograms with their short side parallel to advancing lap seam 4. "Out of registers" 22 are the small, and by industry standards, permissible misalignments of the sheath corrugations. In normal corrugated cable, the corrugation rises of one edge 5 are joined to the corresponding rise of the other edge but in out of registers, the rise of one edge is joined to the corrugation valley of the other edge. The electrical output of screen 21 is connected to the discriminator circuit of FIG. 5 consisting of resistor 23 and capacitor 24. "Out of registers" 22 give short direct current pulses, while true faults 10 give longer direct current pulses. The shorter pulses are filtered out by the discriminator circuit of FIG. 5, so that only faults 10, and not out of registers, operate alarm 16.

The above-described arrangement is illustrative of the invention. Other arrangements, such as the detection of dark spots in other objects, may be devised by those skilled in the art without departing from the spirit and scope of the invention.

What is claimed is:
1. A photoelectric device for detecting anomolous areas of a discrete minimum size which progress through a relatively much larger area comprising a plurality of photoresponsive elements electrically connected in series, the ratio of the areas of one element to the sum of the areas of the entire plurality of elements being approximately equal to the ratio of the area of discrete minimum size to the larger area, means for projecting an image of the anomolous areas on the photoresponsive elements, and means for responding to the change of electrical condition in one element due to passage through the larger area of an anomolous area of at least the discrete minimum size.

2. A photoelectric device for detecting anomolous areas of a discrete minimum size which travel a linear path through a relatively much larger area, comprising a plurality of photoresponsive elements electrically connected in series, means for projecting an image of the anomalous areas on the photoresponsive elements and wherein such elements are arranged in at least two rows perpendicular to the direction of travel of the image of the anomalous areas, the distribution of elements in each of the rows and the dimensioning of each element being such that the image of a minimum discrete area will pass entirely through at least one element, the ratio of the areas of one element to the sum of the areas of the entire plurality of elements being approximately equal to the ratio of the area of discrete minimum size to the larger area, and means for responding to the change of electrical condition in one element due to passage through the larger area of an anomalous area of at least the discrete minimum size.

3. A method of scanning a cable seam for faults comprising the steps of illuminating the seam so as to produce an image of varying light intensity depending upon the condition of the seam, reflecting the image thus produced into an enlarging means, and projecting the thusly enlarged image upon a plurality of photoresponsive means to vary the operating characteristics of the photoresponsive means in response to the varying light intensity of the projected image.

4. A method as in claim 3 further comprising the step of arranging the plurality of photosensitive means electrically in series.

References Cited in the file of this patent

UNITED STATES PATENTS

| | | |
|---|---|---|
| 1,345,586 | Coblentz | July 6, 1920 |
| 2,000,642 | Lamb | May 7, 1935 |
| 2,231,186 | Gould | Feb. 11, 1941 |
| 2,238,762 | Whitaker | Apr. 15, 1941 |
| 2,402,662 | Ohl | June 25, 1946 |
| 2,482,980 | Kallmann | Sept. 27, 1949 |
| 2,732,469 | Palmer | Jan. 24, 1956 |